US011687092B2

(12) United States Patent
Thorne et al.

(10) Patent No.: US 11,687,092 B2
(45) Date of Patent: Jun. 27, 2023

(54) TECHNIQUES FOR BOUNDING CLEANING OPERATIONS OF A ROBOTIC SURFACE CLEANING DEVICE WITHIN A REGION OF INTEREST

(71) Applicant: SharkNinja Operating, LLC, Needham, MA (US)

(72) Inventors: Jason B. Thorne, Dover, MA (US); Andre D. Brown, Natick, MA (US); David S. Clare, London (GB); Nicholas Sardar, London (GB); Christopher P Pinches, Surrey (GB); Samuel Emrys James, London (GB); Michael James Douglas, London (GB)

(73) Assignee: SharkNinja Operating LLC, Needham, MA (US)

( * ) Notice: Subject to any disclaimer, the term of this patent is extended or adjusted under 35 U.S.C. 154(b) by 808 days.

(21) Appl. No.: 16/392,452

(22) Filed: Apr. 23, 2019

(65) Prior Publication Data

US 2019/0320866 A1     Oct. 24, 2019

Related U.S. Application Data

(60) Provisional application No. 62/661,496, filed on Apr. 23, 2018.

(51) Int. Cl.
*G05D 1/02*     (2020.01)
(52) U.S. Cl.
CPC ........ *G05D 1/0276* (2013.01); *A47L 2201/04* (2013.01); *G05D 1/0274* (2013.01)
(58) Field of Classification Search
CPC ........ A47L 5/24; A47L 9/2826; A47L 9/2852; A47L 9/2894; A47L 2201/04; A47L 2201/06; A47L 2201/022; B25J 9/1666; B25J 11/0085
See application file for complete search history.

(56) References Cited

U.S. PATENT DOCUMENTS 4,846,297 A    7/1989  Field et al.
5,379,483 A    1/1995  Pino
(Continued)

FOREIGN PATENT DOCUMENTS

CN    1626025 A    6/2005
CN    1765595      5/2006
(Continued)

OTHER PUBLICATIONS

US 8,271,129 B2, 09/2012, Halloran et al. (withdrawn)
(Continued)

*Primary Examiner* — Ryan Rink
(74) *Attorney, Agent, or Firm* — Grossman Tucker Perreault & Pfleger, PLLC

(57) ABSTRACT

A hand-held surface cleaning device includes circuitry to communicate with a robotic surface cleaning device to cause the same to target an area/region of interest for cleaning. Thus, a user may utilize the hand-held surface cleaning device to perform targeted cleaning and conveniently direct a robotic surface cleaning device to focus on a region of interest. Moreover, the hand-held surface cleaning device may include sensory such as a camera device for extracting three-dimensional information from a field of view. This information may be utilized to map locations of walls, stairs, obstacles, changes in surface types, and other features in a given location. Thus, a robotic surface cleaning device may utilize the mapping information from the hand-held surface cleaning device as an input in a real-time control loop, e.g., as an input to a Simultaneous Localization and Mapping (SLAM) routine.

9 Claims, 5 Drawing Sheets

(56) References Cited

U.S. PATENT DOCUMENTS

| | | |
|---|---|---|
| 5,402,051 A | 3/1995 | Fujiwara et al. |
| 5,867,800 A | 2/1999 | Leif |
| 6,459,955 B1 | 10/2002 | Bartsch et al. |
| 6,584,376 B1 | 6/2003 | Van Kommer |
| 6,629,028 B2 | 9/2003 | Paromtchik et al. |
| 6,845,297 B2 | 1/2005 | Allard |
| 6,968,592 B2 | 11/2005 | Takeuchi et al. |
| 7,024,278 B2 | 4/2006 | Chiappetta et al. |
| 7,117,067 B2 | 10/2006 | McLurkin et al. |
| 7,388,343 B2 | 6/2008 | Jones et al. |
| 7,499,804 B2 | 3/2009 | Svendsen et al. |
| 7,526,362 B2 | 4/2009 | Kim et al. |
| 7,706,917 B1 | 4/2010 | Chiappetta et al. |
| 7,805,220 B2 | 9/2010 | Taylor et al. |
| 7,916,931 B2 | 3/2011 | Lee et al. |
| 7,996,126 B2 | 8/2011 | Hong |
| 8,019,223 B2 | 9/2011 | Hudson et al. |
| 8,160,746 B2 | 4/2012 | Wang et al. |
| 8,195,331 B2 | 6/2012 | Myeong et al. |
| 8,457,789 B2 | 6/2013 | Hong et al. |
| 8,463,436 B2 | 6/2013 | Jeong et al. |
| 8,508,388 B2 | 8/2013 | Karlsson et al. |
| 8,515,578 B2 | 8/2013 | Chiappetta et al. |
| 8,577,538 B2 | 11/2013 | Lenser et al. |
| 8,606,404 B1 | 12/2013 | Huffman et al. |
| 8,780,342 B2 | 7/2014 | DiBernardo et al. |
| 8,798,792 B2 | 8/2014 | Park et al. |
| 8,798,840 B2 | 8/2014 | Fong et al. |
| 8,874,300 B2 | 10/2014 | Allard et al. |
| 8,930,023 B2 | 1/2015 | Gutmann et al. |
| 8,972,052 B2 | 3/2015 | Chiappetta |
| 8,972,061 B2 | 3/2015 | Rosenstein et al. |
| 8,983,661 B2 | 3/2015 | Cho et al. |
| 9,002,511 B1 | 4/2015 | Hickerson et al. |
| 9,008,835 B2 | 4/2015 | Dubrovsky et al. |
| 9,020,637 B2 | 4/2015 | Schnittman |
| 9,026,302 B2 | 5/2015 | Stout et al. |
| 9,037,294 B2 | 5/2015 | Chung et al. |
| 9,037,396 B2 | 5/2015 | Pack et al. |
| 9,110,471 B2 | 8/2015 | Pack et al. |
| 9,146,560 B2 | 9/2015 | Burnett et al. |
| 9,149,167 B2 | 10/2015 | Hong et al. |
| 9,149,170 B2 | 10/2015 | Ozick et al. |
| 9,215,957 B2 | 12/2015 | Cohen et al. |
| 9,250,081 B2 | 2/2016 | Gutmann et al. |
| 9,254,571 B2 | 2/2016 | Hyung et al. |
| 9,278,690 B2 | 3/2016 | Smith |
| 9,280,158 B2 | 3/2016 | Bron et al. |
| 9,310,806 B2 | 4/2016 | Romanov et al. |
| 9,357,893 B2 | 6/2016 | Lee |
| 9,402,518 B2 | 8/2016 | Burlutskiy |
| 9,423,798 B2 | 8/2016 | Liu et al. |
| 9,427,875 B2 | 8/2016 | Goel et al. |
| 9,456,725 B2 | 10/2016 | Kim et al. |
| 9,519,289 B2 | 12/2016 | Munich et al. |
| 9,613,308 B2 | 4/2017 | Izhikevich et al. |
| 9,629,514 B2 | 4/2017 | Hillen et al. |
| 9,630,317 B2 | 4/2017 | Izhikevich et al. |
| 9,675,226 B2 | 6/2017 | Kim et al. |
| 9,675,229 B2 | 6/2017 | Kwak et al. |
| 9,740,209 B2 | 8/2017 | Nakano et al. |
| 9,840,003 B2 | 12/2017 | Szatmary et al. |
| 9,868,211 B2 | 1/2018 | Williams et al. |
| 9,904,284 B2 | 2/2018 | Kwak et al. |
| 9,911,226 B2 | 3/2018 | Hillen et al. |
| 9,983,592 B2 | 5/2018 | Hong et al. |
| 10,052,004 B2 | 8/2018 | Kim et al. |
| 10,058,224 B2 | 8/2018 | Kim et al. |
| 10,105,028 B2 | 10/2018 | Noh et al. |
| 10,268,189 B2 | 4/2019 | Yan |
| 10,291,765 B2 | 5/2019 | So et al. |
| 10,373,389 B2 | 8/2019 | Jung |
| 10,499,782 B2 | 12/2019 | Jung |
| 11,213,177 B2 | 1/2022 | Tonderys et al. |
| 11,397,437 B2 | 7/2022 | Arnold et al. |
| 2004/0236468 A1 | 11/2004 | Taylor et al. |
| 2004/0244138 A1 | 12/2004 | Taylor et al. |
| 2005/0007057 A1* | 1/2005 | Peless .................. G05D 1/0219 318/580 |
| 2005/0010331 A1 | 1/2005 | Taylor et al. |
| 2005/0273967 A1 | 12/2005 | Taylor et al. |
| 2006/0095158 A1 | 5/2006 | Lee et al. |
| 2009/0144931 A1 | 6/2009 | Milligan et al. |
| 2014/0129170 A1 | 5/2014 | Ramachandran et al. |
| 2014/0350839 A1* | 11/2014 | Pack .................... G05D 1/0251 901/1 |
| 2015/0223651 A1 | 8/2015 | Kuhe et al. |
| 2015/0335219 A1* | 11/2015 | Noh .......................... A47L 9/30 15/319 |
| 2017/0083023 A1* | 3/2017 | Park ...................... G05D 1/024 |
| 2017/0150676 A1 | 6/2017 | Yamauchi et al. |
| 2017/0273527 A1 | 9/2017 | Han et al. |
| 2017/0344019 A1 | 11/2017 | Haegermarck et al. |
| 2017/0361456 A1* | 12/2017 | He .......................... A47L 9/009 |
| 2018/0020893 A1 | 1/2018 | Lee et al. |
| 2018/0055312 A1 | 3/2018 | Jung |
| 2018/0092449 A1 | 4/2018 | Strazisar et al. |
| 2018/0255997 A1 | 9/2018 | So et al. |
| 2018/0263450 A1 | 9/2018 | Kim et al. |
| 2018/0292827 A1 | 10/2018 | Artes et al. |
| 2019/0167059 A1 | 6/2019 | Brown et al. |
| 2019/0213755 A1 | 7/2019 | Bassa et al. |
| 2020/0019156 A1 | 1/2020 | Drew et al. |
| 2020/0159246 A1 | 5/2020 | Cui et al. |
| 2020/0237176 A1 | 7/2020 | Bassa |

FOREIGN PATENT DOCUMENTS

| | | | |
|---|---|---|---|
| CN | 201299513 Y | | 9/2009 |
| CN | 102314176 | | 1/2012 |
| CN | 104395849 | | 3/2017 |
| CN | 106843202 | | 6/2017 |
| CN | 106863305 A | * | 6/2017 |
| CN | 106923739 A | | 7/2017 |
| CN | 206295328 U | | 7/2017 |
| DE | 3536974 | | 4/1987 |
| DE | 112016005638 | | 9/2018 |
| EP | 1510896 | | 3/2005 |
| EP | 1548532 | | 6/2005 |
| EP | 2946650 | | 11/2015 |
| EP | 3311722 | | 7/2018 |
| JP | S60188124 A | | 9/1985 |
| JP | 2002085305 | | 3/2002 |
| JP | 2002354139 | | 12/2002 |
| JP | 2006333925 A | | 12/2006 |
| JP | 2013202212 A | | 10/2013 |
| JP | 2016131777 A | | 7/2016 |
| KR | 19860001634 B1 | | 10/1986 |
| KR | 1019930011949 | | 7/1993 |
| KR | 1020010027468 | | 4/2001 |
| KR | 1020050001766 | | 1/2005 |
| KR | 20080041891 | | 5/2008 |
| KR | 20110124652 | | 11/2011 |
| KR | 1020120003054 A | | 1/2012 |
| KR | 20130027345 | | 3/2013 |
| KR | 20130030909 | | 3/2013 |
| KR | 101324168 | | 11/2013 |
| KR | 101341296 | | 12/2013 |
| KR | 101352518 | | 1/2014 |
| KR | 101378883 | | 3/2014 |
| KR | 20140066850 A | * | 6/2014 |
| KR | 101893152 | | 8/2018 |
| WO | 2013-071190 A1 | | 5/2013 |
| WO | 2014-113806 A1 | | 7/2014 |
| WO | 2018158248 | | 12/2018 |

OTHER PUBLICATIONS

KR-20140066850-A Translation (Year: 2014).*
CN-106863305-A Translation (Year: 2017).*
Chinese Office Action with English translation dated Jul. 1, 2020, received in Chinese Patent Application No. 201811114067.2, 16 pages.

(56) References Cited

OTHER PUBLICATIONS

Korean Office Action with English translation dated Aug. 31, 2020, received in Korean Patent Application No. 10-2020-7005226, 15 pages.
Korean Office Action with English translation dated Aug. 31, 2020, received in Korean Patent Application No. 10-2020-7014700, 15 pages.
Japanese Office Action with English translation dated Oct. 14, 2020, received in Japanese Patent Application No. 2020-516621, 6 pages.
U.S. Office Action dated Feb. 5, 2021, received in U.S. Appl. No. 16/649,469, 23 pages.
Korean Office Action with English translation dated Feb. 25, 2021, received in Korean Patent Application No. 10-2020-7014700, 7 pages.
PCT Search Report and Written Opinion dated Jul. 25, 2019, received in corresponding PCT Application No. PCT/US19/28796, 10 pgs.
PCT Search Report and Written Opinion dated Nov. 30, 2022, received in PCT Application No. PCT/US22/40180, 8 pages.
Extended European Search Report dated Nov. 23, 2022, received in European Patent Application No. 19793164.5, 8 pages.

* cited by examiner

TECHNIQUES FOR BOUNDING CLEANING OPERATIONS OF A ROBOTIC SURFACE CLEANING DEVICE WITHIN A REGION OF INTEREST

CROSS REFERENCE TO RELATED APPLICATIONS

The present application claims the benefit of U.S. Provisional Patent Application Ser. No. 62/661,496 filed on Apr. 23, 2018, which is fully incorporated herein by reference.

TECHNICAL FIELD

This specification relates to surface cleaning apparatuses, and more particularly, to a hand-held surface cleaning device with a controller arrangement to communicate with a robotic vacuum or robotic surface cleaning device.

BACKGROUND INFORMATION

Powered devices, such as vacuum cleaners, have multiple components that each receive electrical power from one or more power sources (e.g., one or more batteries or electrical mains). For example, a vacuum cleaner may include a suction motor to generate a vacuum within a cleaning head. The generated vacuum collects debris from a surface to be cleaned and deposits the debris, for example, in a debris collector. The vacuum may also include a motor to rotate a brush roll within the cleaning head. The rotation of the brush roll agitates debris that has adhered to the surface to be cleaned such that the generated vacuum is capable of removing the debris from the surface. In addition to electrical components for cleaning, the vacuum cleaner may include one or more light sources to illuminate an area to be cleaned.

Some types of vacuum devices, such as so-called "upright" vacuums can require a user to supply force to guide the vacuum in a desired direction and to hold a portion of the vacuum's weight in the user's hand. Generally, this includes gripping a handle portion with at least one hand and supplying a force sufficient to guide the nozzle of the vacuum over surfaces to be cleaned during use. Even when a vacuum is self-propelled, e.g., by a drive motor, extended use of such vacuums can result in physical fatigue.

Robotic vacuums can advantageously eliminate fatigue associated with manually operating a vacuum. However, robotic vacuums tend to operate autonomously and lack the ability to adapt to cleaning requirements that change on-the-fly. For example, a robotic vacuum may be unaware an accidental spill has occurred across the room and may take a significant amount of time before the robotic vacuum naturally arrives at the mess.

BRIEF DESCRIPTION OF THE DRAWINGS

These and other features advantages will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

Figure 1:
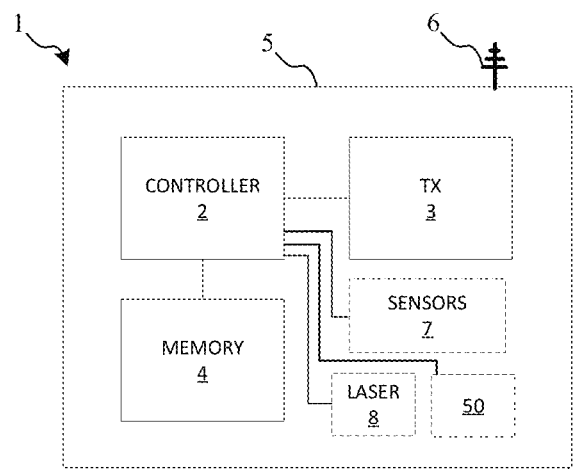
FIG. 1 shows a perspective view of a control system for remotely controlling a surface cleaning device in accordance with an embodiment of the present disclosure.

In general, the present disclosure is directed to a hand-held surface cleaning device that includes circuitry to communicate with a robotic surface cleaning device to cause the same to target an area/region of interest for cleaning. Thus, a user may utilize the hand-held surface cleaning device to perform targeted cleaning (e.g., so-called "spot" cleaning) and conveniently direct a robotic surface cleaning device to focus on a region of interest. Moreover, the hand-held surface cleaning device may include sensory such as a camera device (or other suitable vision system) for extracting three-dimensional information from a field of view. This information may be utilized to map locations of walls, stairs, obstacles (e.g., furniture, toys, and so on), changes in surface types (e.g., wood floors versus carpet), and other features in a given location. Thus, a robotic surface cleaning device may utilize the mapping information from the hand-held surface cleaning device as an input in a real-time control loop, e.g., as an input to a Simultaneous Localization and Mapping (SLAM) routine.

While it may be preferable to implement such vision and mapping systems within a hand-held surface cleaning device and an associated robotic surface cleaning device, this disclosure is not limited in this regard. Computer vision systems including algorithms/logic and supporting hardware, e.g., transmitters and receivers that utilize ultraviolet (UV), near infrared (IR), and any other suitable visible or invisible wavelength, may be implemented within a wide-range of devices. For example, such systems may be implemented, whole or in part, in a handheld cleaning device, a handheld device (e.g., a smart phone, remote control), or an autonomous device (e.g., a drone or robot).

In any event, vision systems may be utilized to identify dirt, dust, organic matter and/or general areas of interest to be cleaned. The information/features acquired by such vision-enabled systems may then be analyzed and used to construct a real-time "dirt mapping" that can be overlaid on to SLAM for navigation. Consumers of the dirt mapping, such as a robotic vacuum and/or via a so-called "app" on a smart phone, may then utilize the data to direct cleaning operations and make modifications to cleaning schedules, locations, and so on. Thus, while the present disclosure makes specific reference to a hand-held surface cleaning device with an integrated vision system, other embodiments are within the scope of this disclosure.

This disclosure may interchangeably use robotic to refer to both devices with and without autonomous control systems, and embodiments and aspects disclosed herein are not intended to be limited to one type of device unless otherwise specified.

In one specific example embodiment, the hand-held surface cleaning device may utilize direct communication with the robot vacuum to transmit commands, such as via Wi-Fi (i.e., an IEEE 802.11 protocol), Bluetooth Low Energy (BLE), or other wireless communication approach. Alternatively, the hand-held surface cleaning device may communicate indirectly via, for example, visible or invisible wavelengths provided by one or more laser devices, and/or via sound waves which are audible or inaudible to a user. For example, the hand-held surface cleaning device may include a laser device to emit light, which in turn may be detected by sensory of the robotic surface cleaning device and used as a navigational point/target in order to focus cleaning on an area of interest. In other examples, sound which is audible or inaudible to the human ear may be used to communicate information/commands to a robotic surface cleaning device. The sound may originate from the hand-held surface cleaning device to the robotic surface cleaning device, and vice-versa.

In still another example a remote device may operate as a beacon to provide a positional signal such as audible or inaudible sound waves, a radio frequency (RF) signal, or any other suitable signal. Note, the remote device may also be a hand-held surface cleaning device or may be a different device. In any event, a robotic surface cleaning device and/or held-held surface cleaning device may use triangulation or other suitable localization approach to establish a relative position between the robotic surface cleaning device and the hand-held surface cleaning device based on the positional signal emitted by the remote device. Thus, the robotic surface cleaning device and/or hand-held surface cleaning device may utilize the established relative position to allow the robotic surface cleaning device to navigate to a desired location, e.g., to travel position of the hand-held surface cleaning device and/or performing cleaning at a desired location. Accordingly, a robotic surface cleaning device may advantageously navigate to a desired location even when the hand-held surface cleaning device lacks a line of soft to the robotic surface cleaning device, which is a limitation of existing approaches that utilize light-based systems and those that utilize maps.

In another example embodiment, a system for controlling a robotic surface cleaning device via a control cable/tether is disclosed. The control cable may include a first end for electrically coupling to a robotic surface cleaning device and a second end for optionally coupling to a power supply, e.g., AC mains. One or more wires may be disposed along the length of the control cable for providing power and/or command signals to a robotic surface cleaning device. The control cable may further include a grip/handle portion disposed along the control cable that a user may grip with one or both hands. The user may then provide input in the form of gestures (e.g., forward/back/left/right motions or other suitable gestures) which may be similar to movements normally employed to operate an upright vacuum, but without the physical effort normally exerted. The user input may then be converted into a signal and provided to the robotic surface cleaning device, e.g., via the one or more wires within the control cable, to cause the same to move in a desired direction.

The grip portion may be fixed/integrated into the control cable such that the grip portion cannot be removed. Alternatively, in some embodiments the grip portion may be removable to allow for wireless control of the robotic surface cleaning device. In these embodiments the grip portion may be configured as a hand-held surface cleaning device, as discussed above. Accordingly, the grip portion may be docked to the control cable for charging and/or storage purposes. Note the robotic surface cleaning device may include a dock to couple to the removable grip portion (or hand-held surface cleaning device), for storage purposes.

Figure 2:
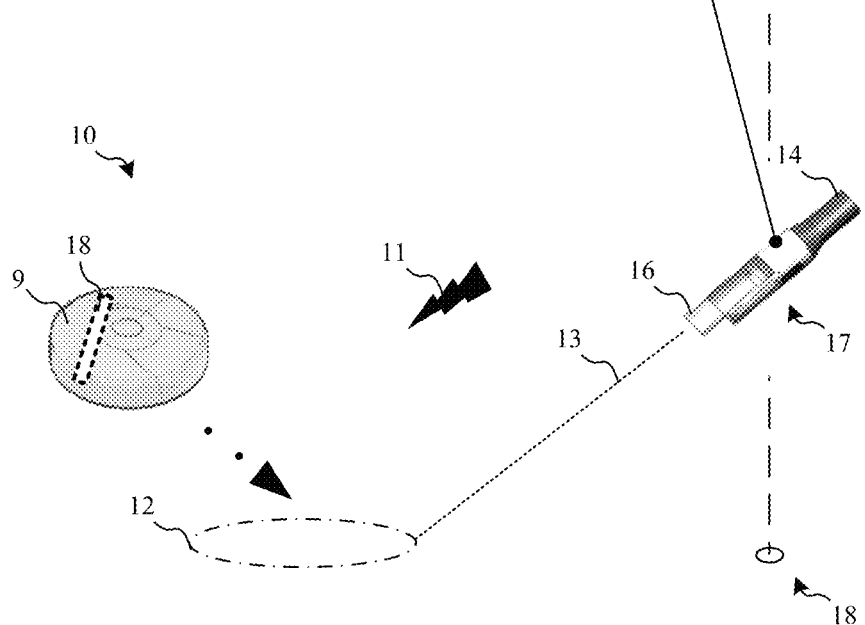
FIG. 2 shows an example embodiment of a hand-held surface cleaning device implementing the control system of FIG. 1.

A hand-held surface cleaning device consistent with aspects of the present disclosure includes a nozzle fluidly coupled to a body (or body portion) with a motor, power source and dust cup disposed within a cavity provided by the body. One such example hand-held surface cleaning device is shown in FIG. 2 and is in a so-called "wand" or substantially co-linear configuration whereby substantially all of the components reside along the same longitudinal axis (e.g., the nozzle, dirty air passageway, motor, dust cup and power source). In this embodiment, the body portion may also function as a handgrip to allow the hand-held surface cleaning device to be comfortably operated by one hand, for example. However, this disclosure is not intended to be limiting in this regard and the hand-held surface cleaning device may include different configurations.

As generally referred to herein, dust and debris refers to dirt, dust, water, or any other particle that may be pulled by suction into a hand-held surface cleaning device. Also, as generally referred to herein, a surface cleaning device may include a device configured to collect and store debris and/or dispense cleaning fluid.

Turning to the Figures, FIG. 1 illustrates a block diagram of a control system 1 consistent with aspects of the present disclosure. As shown, the control system 1 comprises an arrangement of components including a controller 2, a transmitter (TX) circuit 3, a memory 4, a housing 5, an optional antenna 6, optional sensor(s) 7, and an optional laser (or light source) 8, and optional sound emitter 50. In an embodiment, the control system 1 may be implemented in a hand-held surface cleaning device, e.g., hand-held surface cleaning device 17 (see FIG. 2). However, aspects and components of the control system 1 may be implemented at least in part within a remote surface cleaning device, e.g., robotic surface cleaning device 9. For example, the controller 2 be implemented within the robotic surface cleaning device 9, and in this scenario the hand-held surface cleaning device 17 may also include a controller but perform limited amounts of processing on captured data such that the remainder of processing gets performed by the controller 2 within the robotic surface cleaning device 9. In addition, aspects and components of the control system 1 may be provided by a control cable, as discussed in greater detail below (see FIG. 3), which may be removably or non-removably coupled thereto depending on a desired configuration.

Continuing on, the controller 2 comprises at least one processing device/circuit such as, for example, a digital signal processor (DSP), a field-programmable gate array (FPGA), Reduced Instruction Set Computer (RISC) processor, x86 instruction set processor, microcontroller, an application-specific integrated circuit (ASIC). The controller 2 may comprise a single chip, or multiple separate chips/circuitry. The controller 2 may implement a robotic surface cleaning device control process using software (e.g., C or C++ executing on the controller/processor 2), hardware (e.g., circuitry, hardcoded gate level logic or purpose-built silicon) or firmware (e.g., embedded routines executing on a microcontroller), or any combination thereof. The robotic surface cleaning device control process may be configured to receive input via sensors 7 and convert the same into control commands to send to the robotic surface cleaning device 9.

In an embodiment, the TX circuit 3 may comprise a network interface circuit (NIC) for communication via a network, e.g., the Internet or local area network such as a Bluetooth connection. The TX circuit 3 and the antenna device 6 may also be referred to herein as an antenna arrangement. The robotic surface cleaning device 9 (FIG. 2) may also implement a such an antenna arrangement to communicate with the hand-held surface cleaning device 17.

The laser 8 comprises any suitable device suitable for emitting visible or invisible light. As discussed below, the laser 8 may be configured to emit a single, focused beam or a beam pattern (e.g., a grid). In an embodiment, the laser 8 comprises range finding circuitry such that the laser 8 provides the control system 1 laser range finding capabilities. The laser 8 may therefore output measurements that correspond to a relative distance between the laser 8 and the object/surface which the laser light emitted from the laser 8 is incident.

The sound emitter 50 may comprise, for instance, a speaker and a driving circuit to emit sound waves. The sound waves may comprise audible tones (about 20 Hz to 20 kHz) perceivable by a human ear or inaudible tones (e.g., below about 20 Hz and above about 20 kHz). The tones may be utilized to communicate with the robotic surface cleaning device 9. The sensors 7 may include a microphone or other suitable sensor capable of detecting sound waves from the robotic surface cleaning device. Accordingly, the hand-held surface cleaning device 17 and the robotic surface cleaning device may communicate in a unidirectional or bidirectional manner using sound waves. In an embodiment, the sound waves may be utilized exclusively for communication between the robotic surface cleaning device 9 and the hand-held surface cleaning device 17, although in other embodiments sound waves with or without RF communication may be utilized.

The optional sensors 7 may comprise, for example, a gyroscope and/or accelerometer. In some cases, the gyroscope comprises a 3-axis gyroscope. The optional sensors 7 may further include an image sensor (or camera device) such as a semiconductor charge-coupled device (CCD), active pixel sensors in complementary metal-oxide-semiconductor (CMOS), stereo vision sensor, or other suitable sensor that allows for extraction of 3D features/information from digital images. The optional sensors 7 may further enable dirt sensing via visible light, hyperspectral imaging processing, or any other suitable vision-based approach. The hand-held surface cleaning device 17 may also be utilized by a user to move about an area to generate a dirt map. A robotic surface cleaning device may then utilize the dirt map for reference purposes to ensure cleaning efficiency. Likewise, a user may utilize the dirt map to perform manual cleaning using, for example, a broom or the hand-held surface cleaning device 17.

The optional sensors 7 may further comprise a GPS chip capable of outputting location data.

The memory 4 may comprise volatile and/or non-volatile memory devices. In an embodiment, the memory 4 may include a relational database, flat file, or other data storage area for storing gesture profiles. The gesture profiles may be utilized, for example, to train various gestures (e.g., hand/wrist motions) to detect user input and control the robotic surface cleaning device 9 based on the same.

In an embodiment, the memory 4 may further store a plurality of operating modes for the robotic surface cleaning device 9. A user may then select a particular operating mode, and the antenna arrangement may then send a signal to the robotic surface cleaning device 9 to cause the same to transition into a desired operational mode. The modes may be manually selected, or automatically selected based on sensor input. The modes may each be associated with movement/operational sequences such as spot cleaning, wall following, perimeter following, mapping, dirt sensing, and air quality sensing, just to name a few.

FIG. 2 shows an exemplary embodiment of a cleaning system consistent with the present disclosure. As shown, the cleaning system 10 includes a hand-held surface cleaning device 17 and a robotic surface cleaning device 9. The hand-held surface cleaning device 17 can implement the control system 1 of FIG. 1. The hand-held surface cleaning device 17 includes a housing that is generally shaped/contoured to be comfortably gripped in one hand. The hand-held surface cleaning device 17 may include a coaxial/linear configuration whereby the nozzle 16 and the handle portion 14 are disposed along the same longitudinal axis. The handle portion 14 may include a motor (e.g., a BLDC motor), a power supply (e.g., one or more batteries) and a dust cup disposed therein. The dust cup may include a cyclonic dirt separation arrangement. Thus, dirt and debris may then be pulled into the nozzle 16 via suction generated by the motor.

The robotic surface cleaning device 10 may include a known configuration and may include a housing, a nozzle, a dust cup for storage of dirt and debris, a control system (e.g., a controller and associated circuitry), and a drive motor for driving one or more wheels. The control system may implement, for example, an autonomous cleaning and navigation control loop. One such example control loop includes a Simultaneous Localization and Mapping (SLAM) routine/process, although other approaches to autonomous navigation and control are within the scope of this disclosure. In an embodiment, the robotic surface cleaning device 9 includes a mounting surface/receptacle 18 for coupling to the hand-held surface-cleaning device for storage and/or recharging purposes.

In use, the hand-held surface cleaning device 17 may directly or indirectly communicate a control command to the robotic surface cleaning device 9. For example, the hand-held surface cleaning device 17 may directly communicate with the robotic surface cleaning device 9 by sending one or more wireless signals 11. Alternatively, or in addition, the robotic surface cleaning device 9 may indirectly communicate with the robotic surface cleaning device 9 by emitting a light 13 (and/or sound) adjacent a region of interest 12, as discussed in greater detail below.

In either case, the robotic surface cleaning device 9 may respond by focusing cleaning in a semi-autonomous manner about region of interest 12. As generally referred to herein, semi-autonomous refers to a cleaning sequence/procedure whereby the robotic surface cleaning device 9 navigates to the region of interest 12 in response to user input, i.e., based on receiving a control command from the hand-held surface cleaning device 17, but in an autonomous manner, e.g., which may include avoiding known obstacles, furniture, walls, etc., to perform various automated cleaning sequences including movements in a forward/back/left/right. Thus, the autonomous navigation (e.g., implemented via SLAM) may effectively control the moment to moment movement and navigation of the robotic surface cleaning device 9, but the user may set a target area/region of interest 12 and confine subsequent movement of the robotic surface cleaning device for a predefined period of time to the same. For example, the robotic surface cleaning device 9 may remain within/adjacent the region of interest 12 for at least the amount of time to make one or more passes over the surfaces to be cleaned. Those areas outside of the region of interest 12 may therefore be ignored or excluded. Of course, the larger the region of interest 12 the longer the amount of time the robotic surface cleaning device 9 may remain in this focused, semi-autonomous cleaning mode.

The robotic surface cleaning device 9 may avoid certain regions of interest, which in this context may be more accurately referred to as regions of non-interest, exclusion regions, or simply ignore regions. In this instance, one or more regions may be identified as disclosed herein as regions which a user desires to have ignored. For example, some areas of a surrounding environment may have objects and furniture that may be easily damaged by a robotic surface cleaning device. These areas may then be easily identified by a user, e.g., using a hand-held device, and indicated as an 'ignore' region. A robotic surface cleaning device can receive an indication of these 'ignore' regions and avoid those regions during cleaning operations.

In an embodiment, the emitted light 13 includes a grid, e.g., an M×N array, that may be projected onto the region of interest 12. The robotic surface cleaning device 9 may respond by focusing cleaning on the area on which the emitted light 13 is incident. In some cases, the control system 1 may utilize the grid in combination with vision sensors to determine a topology/mapping for the region of interest 12. This information may allow for distinguishing and mapping of carpeted surfaces versus hardwood floors, as well as mapping of wall and stair locations, obstacle locations, and so on. Note, such information may also be provided via user input via, for instance, an 'app' that allows a user to manually identify or otherwise confirm the location and presence of such features/obstacles. The information may be then communicated to the robotic surface cleaning device 9, e.g., wirelessly via signals 11, which in turn may then utilize the information as inputs in the SLAM algorithm or other control loop implemented within the robotic surface cleaning device 9.

Therefore, the robotic surface cleaning device 9 may update its known mapping information using the mapping information from the hand-held surface cleaning device 17. This may result in, for example, the robotic surface cleaning device adjusting an operational parameter during cleaning such as, for example, height of an associated nozzle to accommodate hardwood floors versus carpet where transitions occur, change suction strength relative to surface types, activate/deactivate an agitator, activate supplemental brushes, deploy cleaning solution, and so on. In addition, the robotic surface cleaning device 9 may also improve obstacle detection and otherwise enhance navigation by utilizing mapping information from the hand-held surface cleaning device 17.

In an embodiment, the grid (e.g., structured light, dot pattern, and so on) projected by the emitted light may further be used to communicate movement commands to the robotic surface cleaning device 9 such as accelerate/decelerate and turn commands. In one example case, as the hand-held surface cleaning device 17 is angled up, the projected grid may "stretch", and in response thereto, the robotic surface cleaning device 9 accelerates. On the other hand, as the projected grid is directed downwards towards an orientation that is perpendicular or substantially transverse to the floor, the projected grid may return to orthogonal and regular spacing, and in response to that change, robotic surface cleaning device 9 slows/stops. By detecting an inversion/transition in a given direction, e.g., from stretched to regular and then to stretched in the opposite direction, the robotic surface cleaning device 9 may the reverse direction. As the projected grid turns/rotates relative to the robotic surface cleaning device 9, the robotic surface cleaning device 9 may then rotate to re-align the projected grid to a fore-aft axis of the robotic surface cleaning device 9. Stated differently, rotation of the projected may cause a proportional change in alignment of the robotic surface cleaning device 9.

In an embodiment, a user grips then hand-held surface cleaning device 17 and can use the laser 8 to "draw" a boundary defining the region of interest 12 using, for instance, the laser 8. The user can remain stationary and draw the region of interest 12, or travel throughout a surrounding environment to draw the region of interest 12. The hand-held surface cleaning device 17 can include a user input, e.g., a button, to transition the hand-held surface cleaning device into a mode to draw a boundary defining the region of interest. A visible beam of light may then be projected to aid the user as they target the particular area of surface to include within the region of interest 12. At the same time, the laser 8 may utilize a range-finder circuit to output distance measurements to the target, and a GPS sensor can output an origin (or originating coordinate) from which the distance measurements were made. Note, the origin may captured via other sensory an approaches, such as using RF triangulation.

The controller 2 may then perform a localization routine using this captured data (also referred to herein collectively as measured location data) to translate the region of interest 12 into a plurality of localized coordinates that the robotic surface cleaning device 9 can use to update map in memory and perform focused cleaning operations within the region of interest 12. Additional data, such as image data captured by one or more image sensors of the hand-held surface cleaning device 17 may be used to determine surface types for the region of interest, identify obstacles and features (e.g., walls, stairs, and so on). Thus, the measured location data may also further include image data. One such example method for identifying the region of interest 12 based on the "drawn" boundary defining region of interest 12 is discussed further below with reference to FIG. 5.

In any event, the drawn boundary may then be mapped and provided to the robotic surface cleaning device for navigation purposes. In some cases, the region of interest is overlaid onto a SLAM map and may be stored, e.g., in a memory of the robotic surface cleaning device 9. The robotic surface cleaning device 9 may then remain substantially within the boundary to focus cleaning for a predetermined period of time, or alternatively, until a user issues a subsequent command to cause the robotic surface cleaning device 9 to resume autonomous cleaning operations.

Alternatively, a user may execute manual control of the robotic surface cleaning device 9, wherein manual control includes a user directing each movement of the robotic surface cleaning device 9. For example, a user may direct each movement of the robotic surface cleaning device by performing gestures with or movements of the hand-held surface cleaning device 17. Note the hand-held surface cleaning device may further include a joystick (not shown) or other similar control, e.g., buttons, to receive user input and convert the same into control commands to send to the robotic surface cleaning device 9.

Continuing on, a user may direct the robotic surface cleaning device 9 to move forward by angling the nozzle 16 of the surface cleaning device 17 towards the floor. On the other hand, a user may angle the nozzle 16 of the surface-cleaning device towards a ceiling to cause the robotic surface cleaning device 9 to travel backwards. Turns may be accomplished by rotating the hand-held surface cleaning device 17 about its longitudinal axis (e.g., by a user twisting their wrist) or by simply pointing the nozzle 16 of the hand-held surface cleaning device to the right or left of a user. The sensors 7, and more particularly the gyroscope and/or accelerometer, may be utilized to detect and quantify the gestures as input signals. Accordingly, numerous gestures are envisioned within the scope of this disclosure and the particular examples provided above are not intended to be limiting.

A user may temporarily desire manual control, and in accordance with an embodiment, the user may transition between manual, semi-autonomous and fully-autonomous control with a predefined gesture or other input (e.g., via a button) received by the hand-held surface cleaning device 17.

Figure 5:
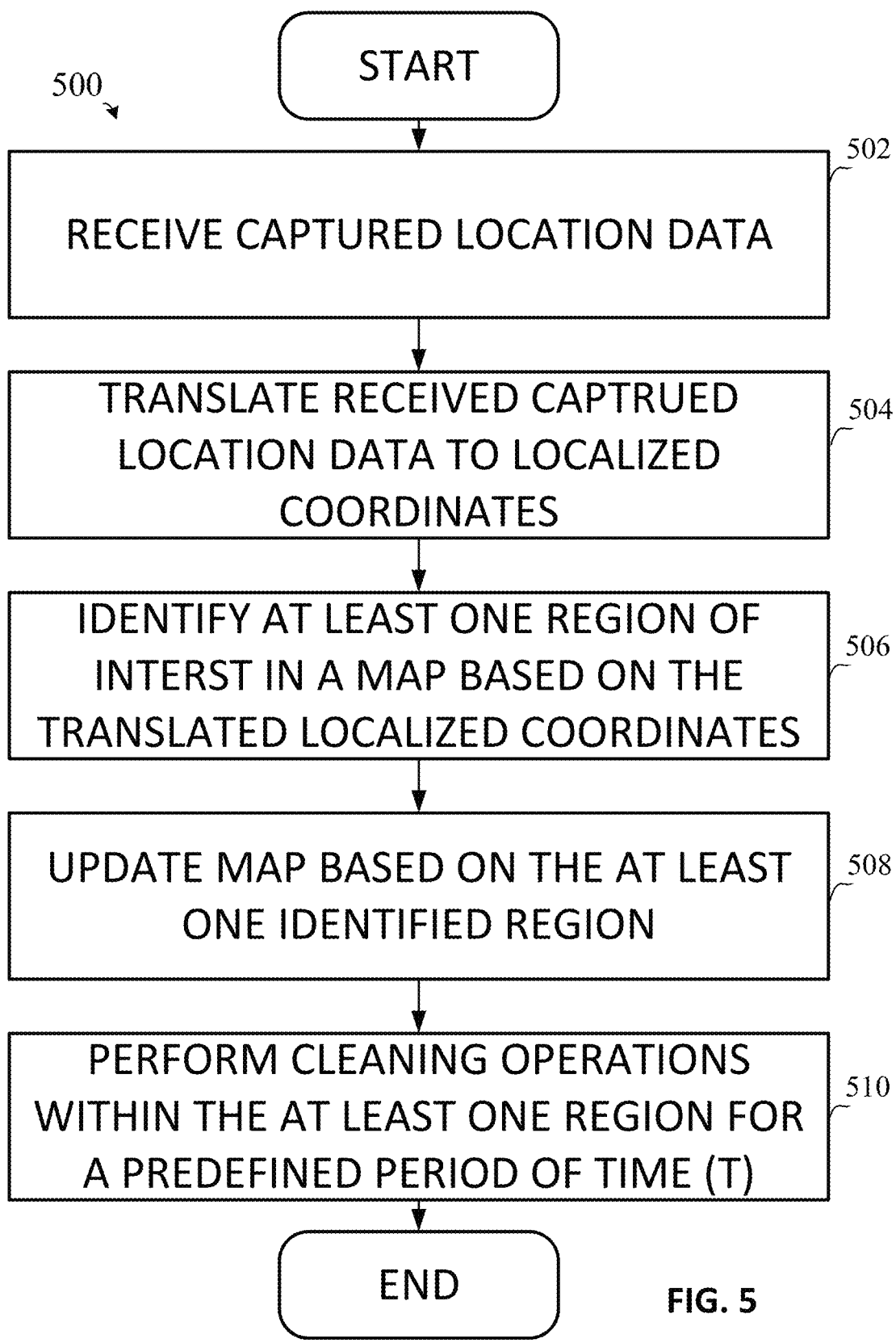
FIG. 5 shows an example method consistent with the present disclosure.

Turning to FIG. 5, an example method 500 for localizing a plurality of location data points and identifying a region of interest based on the same is shown. The method 500 may be executed by the controller 2 of FIG. 1, although this disclosure is not necessarily limited in this regard.

In act 502, the controller 2 receives captured location data. The captured location data can include a plurality of location data points in the form of a plurality of distance measurements captured by the laser 8, e.g., based on the user "drawing" a boundary thereby that defines the region of interest 12. The captured location data can further include an associated origin from which each measurement was made as well as gyroscope data that represents the yaw/pitch/roll of the hand-held surface cleaning device 17 as each measurement was captured. Still further, the measured location data can further include image data which can be used to identify obstacles, structural features such as walls, and other features that are associated with the region of interest 12.

In act 504, the controller 2 translates the captured location data, and more particularly, the plurality of distance measurements, into localized coordinates. In more detail, the controller 2 first optionally filters the plurality of distance measurements and normalizes the same to remove outliers and extraneous measurements (e.g., measurements that were caused by a user accidently pointing the laser 8 at the ceiling or at a location that exceeds a predefined distance limit or angle). The controller 2 then translates each remaining distance measurement into a localized coordinate, e.g., a cartesian coordinate, using a relatively simple formula that utilizes the Euclidian distances between the measured distance and associated origin, and the pitch/yaw/roll of the hand-held surface cleaning device 17 to orient the hand-held surface cleaning device 17 in 3D space above the surface to be cleaned and output a local coordinate. Note, other approaches to localizing measurement data is within the scope of this disclosure and the provided example is not intended to limit the present disclosure.

In act 506, the controller 2 then identifies at least one region of interest in a map based on the translated local coordinates. This can include the controller 2 overlying the plurality of localized coordinates on to a map in memory and establishing a boundary/perimeter that reflects the position of the localized coordinates (e.g., in a connect-the-dot manner). Alternatively, the shape which the localized coordinates reflect may be compared to known geometric shapes and a closet match may then be used to derive the boundaries for the region of interest. For example, consider the map of embodiment shown in FIG. 6A, wherein a plurality of local coordinates (X) collectively appear as a circular shape. In this instance, the controller 2 may identify that shape formed by the local coordinates matches, within a high degree of certainty, a circular shape, e.g., based on a probability distribution function (PDF) or other mathematical function. Thus, the generated region of interest 12 may be configured to encompass at least a majority of the localized coordinates as is shown in the example embodiment of FIG. 6A. Note, other normal and irregular geometric shapes may be recognized and utilized by the controller 2 to determine the region of interest 12 including, for instance, rectangles, ellipses, and so on.

Figure 6A:
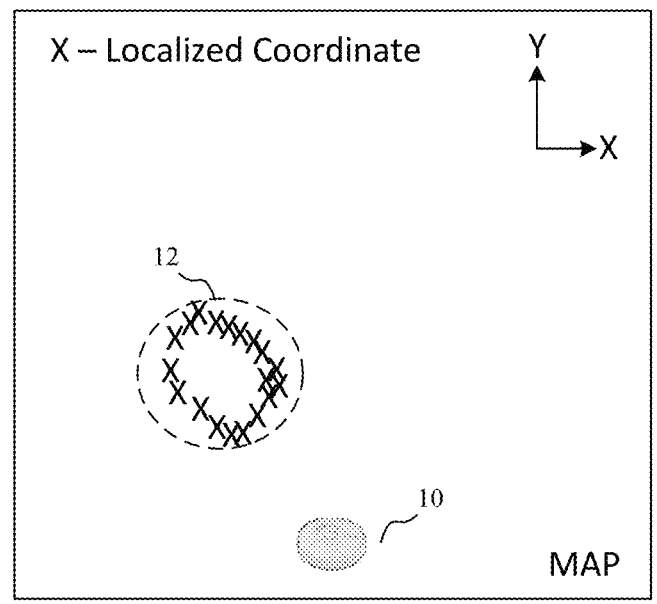
FIG. 6A shows an example map for use by a robotic surface cleaning device, consistent with embodiments of the present disclosure.
Figure 6B:
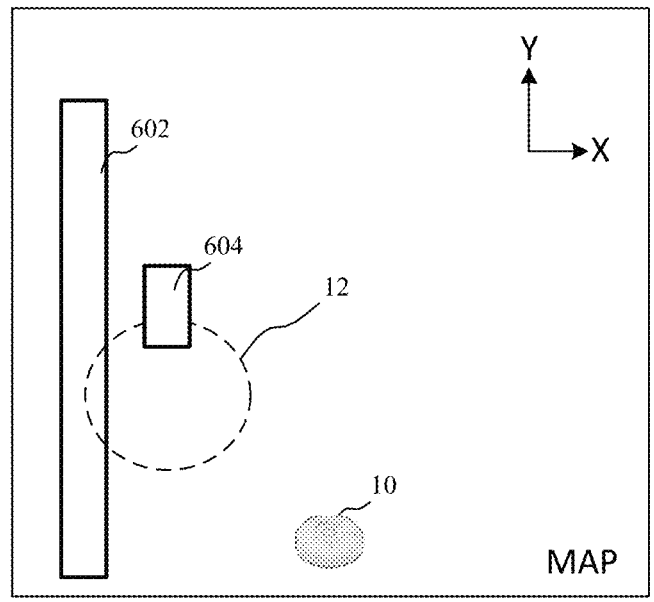
FIG. 6B shows another example map for use by a robotic surface cleaning device, consistent with embodiments of the present disclosure.

In act 508, the controller 2 updates the map based on the least one identified region. Note, act 508 may be performed by the controller 2 within the hand-held surface cleaning device 17, or remotely by another controller such as a controller within the robotic surface cleaning device 9. Continuing on, one example of such an example map updated to include at least one identified region, e.g., region of interest 12, is shown in FIG. 6A. In addition, the controller 2 may further update the map based on image data associated with the measured location data. For instance, obstacles such as furniture, pets, walls, stairs, and so on may be identified based on the image data and represented in the updated map to aid navigation. For example, the embodiment of FIG. 6B shows an updated map where image data was utilized to identify the position of a wall 602 and a furniture object 604 adjacent the region of interest 12. Thus, the robotic surface cleaning device 9 may utilize the updated map to account for obstacles within the region of interest 12 during cleaning operations. Moreover, the updated map may be utilized beyond just the region of interest 12 as the robotic surface cleaning device 9 can utilize the updated map to navigate the surrounding environment during general cleaning operations.

In act 510, a robotic surface cleaning device, e.g., robotic surface cleaning device 9, performs cleaning operations within the at least one identified region for a predefined period of time, which may also be referred to as a bounded cleaning operation or mode. In act 510, the robotic surface cleaning device 9 may receive a command from the hand-held surfacing cleaning device 17 to begin the cleaning operations. In addition, the robotic surface cleaning device 9 may adjust the cleaning mode to account for one or more floor types associated with the at least one identified region. As was previously discussed, the measured location data may include image data, for instance, that can be utilized to identify a floor type associated with the at least one identified region. The adjustment to the cleaning mode therefore can include, for instance, deploying a cleaning element, dispensing cleaning fluid, raising or lowering brushrolls, disabling brushrolls, and so on, to ensure the cleaning mode is suited to the detected floor type.

In an embodiment, the robotic surface cleaning device 9 may utilize the shape of the at least one identified region of interest to alter the navigation path the robotic surface cleaning device takes while performing cleaning operations in act 510. For instance, a circular region of interest may cause the robotic surface cleaning device to navigate along a path that follows the perimeter of the region in clock-wise or counter-clockwise fashion, then with each pass the robotic surface cleaning device can swerve/turn and then complete ever smaller and smaller circles until reaching the center. Likewise, a rectangular region of interest can cause the robotic surface cleaning device to navigate in a strip-like manner that includes a straight line of travel across the width of the region, a 180 degree turn, and another straight line of travel, and so on. In addition, a user may establish the path to take by first establishing the region of interest, as discussed above, then "coloring in" that region using the laser 8 such that robotic surface cleaning device 17, in a general sense, follows the brushstrokes while performing cleaning operations within the region of interest. This can also allow the user to designate a particular section within the region of interest as needing additional scrubbing/focused cleaning by the robotic surface cleaning device.

In an embodiment, the user can "train" a robotic surface cleaning device to operate in a finely tuned manner by "learning" the user's particular cleaning preferences. For instance, a user can "draw" one or more regions of interest using the laser 8, as described above, and then have the robotic surface cleaning device 9 store the region(s) of interest in a memory. Using an "app" or other such user input, the user may then schedule that region to be cleaned at specific times using a schedule, or on demand, or both. In addition, the user may set region(s) of interest as a so-called "priority regions" whereby all cleaning operations begin, or at least include, focused cleaning within the stored region(s) of interest. One use-case example demonstrates additional utility of this approach. Consider a scenario where a section of a room is used as a play-area for children, or as s location for a pet bed. The user may therefore "draw" those regions using the laser 8 and then engage a feature, e.g., an app interface, that sets those regions as high-traffic, priority areas. In turn, the robotic surface cleaning device may then clean those priority regions with more regularity, e.g., the interval of time between the robotic surface cleaning device 9 cleaning the high priority regions is relatively less than the interval used for other non-high priority regions, and/or for additional amounts of time, e.g., the robotic surface cleaning device may travel slower in these areas to maximize exposure to suction and brushrolls, make additional passes in the high-priority areas, and so on.

Figure 3:
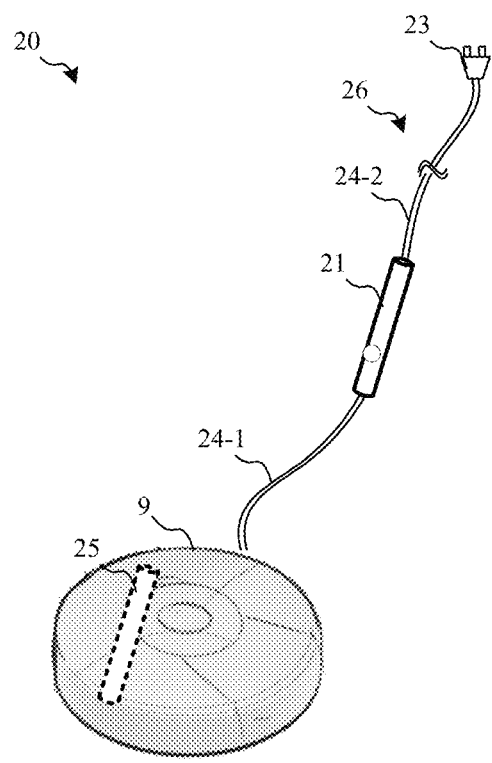
FIG. 3 shows a perspective view of a control cable coupled to a robotic surface cleaning device consistent with embodiments of the present disclosure.

FIG. 3 shows another example embodiment consistent with the present disclosure. As shown, the embodiment of FIG. 3 includes a control cable 26 having a first end (or robotic surface cleaning device end) for electrically coupling to the robotic surface cleaning device 9 and a second end for electrically coupling to an electrical outlet, e.g., AC mains. A handle portion 21 (or housing portion 21) is disposed along the control cable 26 between the first and second end. The first end may include a connector, e.g., USB-C or other suitable connector, for coupling to the robotic surface cleaning device 9. The second end may include a plug 23 having a plurality of prongs for coupling to AC mains. The segment 24-2 of the control cable 26, measured from the handle portion 21 to the second end (e.g., the AC coupling end), may have an overall length that is greater than the overall length of segment 24-1 of the control cable measured from the handle portion 21 to the first end. Thus, the control cable 26 may allow a user to have a degree of freedom to move about a room with the robotic surface cleaning device 9 during cleaning operations while maintaining electrical connectivity with the electrical outlet. In an embodiment, the robotic surface cleaning device 9 does not include autonomous navigation systems and movement directions may be determined based on signals from handle portion 21.

Alternatively, the second end of the control cable 26 may be electrically uncoupled from the wall and the user may follow the robotic surface cleaning device during cleaning without being tethered to an electrical outlet. In this example, the handle portion 21 may utilize an internal power supply, e.g., a battery, and/or may utilize power from a battery within the robotic surface cleaning device 9. In this case the control cable 26 may include segments 24-1 and 24-2 removably coupled to the handle portion 21. The segments 24-1 and 24-2 may be decoupled into two separate segments based on a user-supplied force, for example. Segment 24-2 may be decoupled from the handle portion 21 leaving just the robotic surface cleaning device 9, segment 24-1, and the handle portion 21 during use by a user. In another embodiment, both segments 24-1 and 24-2 may be removed and thus allowing the handle portion to operate without a direct connection with the robotic surface cleaning device 9.

The handle portion 21 may implement the control system 1 discussed above, the description of which will not be repeated for brevity. The control system 1 may communicate with the robotic surface cleaning device 9 via one or more wires within the control cable 26, or wirelessly depending on a desired configuration. The one or more wires may also provide power to the robotic surface cleaning device 9 from AC mains, for example.

In an embodiment, the handle portion 21 may be removably coupled to the control cable 26. To this end, the control cable 26 may include base or other mounting surface that allows the handle portion 21 to dock. In this example, the base/mounting surface may include electrical contacts for electrically coupling the handle portion 21 to the control cable 26, and by extension, the robotic surface cleaning device 9. As shown, the robotic surface cleaning device 9 may include a receptacle or other mounting surface 25 to allow a detached handle portion 21 to be coupled thereto for storage and/or recharging purposes. Accordingly, a user may remove the handle portion 21 from the robotic surface cleaning device 9 and then simply attach the same to the control cable when fine-grain control of the movements of the robotic surface cleaning device is desired.

Figure 4:
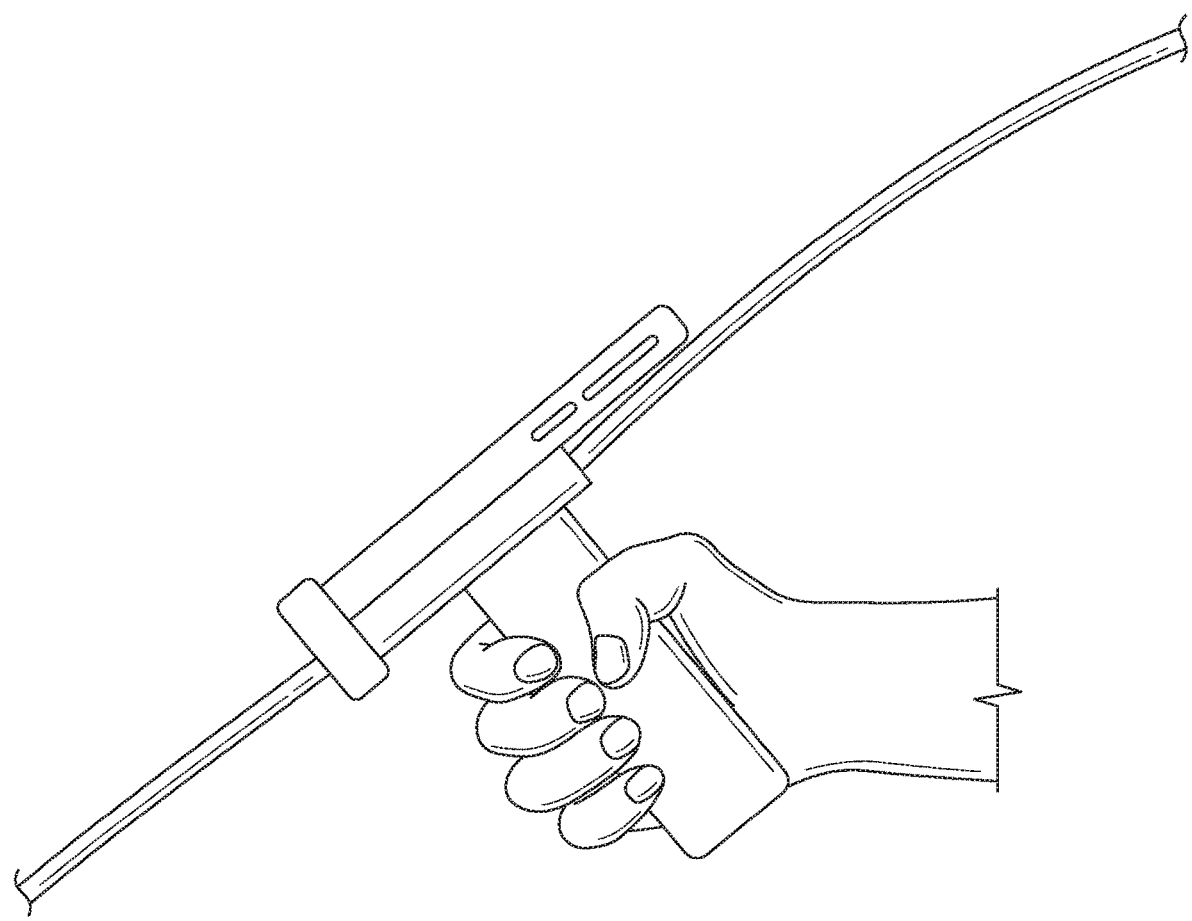
FIG. 4 shows another perspective view of a control cable consistent with an embodiment of the present disclosure.

In an embodiment, the handle portion 21 may be implemented as a mobile computing device such as a smart phone, cell phone, or other such device. In some cases, the handle portion may include a mounting region for coupling to a mobile computing device (see FIG. 4). The mounting region may include a mating connector, e.g., a USB-C or other suitable connector type, for providing electrical power and/or for communicating signals to the robotic surface cleaning device 9.

In an embodiment, a so-called "app" may be utilized on a mobile computing device that allow a user to change the settings of the robotic surface cleaning device 9, store a plurality of operating modes, and/or change operating characteristics of the robotic surface cleaning device 9 such as responsiveness of the acceleration and steering. The mobile computing device may further include sensory such as an accelerometer, gyroscope, camera, and so on, that may be utilized by the "app" to communicate and direct the robotic surface cleaning device 9 either wirelessly or in a wired fashion.

In accordance with an aspect of the present disclosure a control system for controlling a robotic surface cleaning device is disclosed. The control system comprising a robotic surface cleaning device having a nozzle to receive dirt and debris and configured to travel about a surrounding environment, a hand-held device comprising an antenna arrangement to communicate with the robotic surface cleaning device and at least a first sensor to capture a plurality of location data points, each location data point corresponding to a physical location in the surrounding environment, and a controller configured to translate the captured location data points into a plurality of localized coordinates, each localized coordinate of the plurality of localized coordinates corresponding to locations in a map that virtually represents the surrounding environment, identify at least one region of interest in the map based on the translated localized coordinates, and send a command to cause the robotic surface cleaning device to remain substantially within areas of the surrounding environment corresponding to the at least one identified region of interest during cleaning operations.

In accordance with another aspect, a method of updating a map in a memory for use by a robotic surface cleaning device during autonomous or semi-autonomous cleaning operations, the map virtually representing an environment surrounding the robotic surface cleaning device. The method comprising receiving, by a controller, a plurality of location data points, each of the plurality of location data points having an associated origin of measurement representing a location in a surrounding environment from which a given location data point of the plurality of location data points was captured, translating, by the controller, the plurality of location data points into a plurality of localized coordinates based on the origin of measurement, identifying, by the controller, at least one region of interest in the map based on the localized coordinates of the plurality of localized coordinates, and updating, by the controller, the map in the memory based on the at least one identified region of interest.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a surface cleaning apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A cleaning system comprising:
    a robotic surface cleaning device configured to autonomously travel about a surrounding environment while collecting dirt and debris;
    a hand-held surface cleaning device comprising:
        a body having a handle and a nozzle;
        a power supply;
        a suction motor fluidly coupled to the nozzle;
        an antenna arrangement to communicate with the robotic surface cleaning device; and
        at least a first sensor to capture a plurality of location data points, each location data point corresponding to a physical location in the surrounding environment; and
    a controller configured to:
        translate the captured location data points into a plurality of localized coordinates, each localized coordinate of the plurality of localized coordinates corresponding to locations in a map that virtually represents the surrounding environment;
        identify at least one region of interest in the map based on the translated localized coordinates; and
        send a command to cause the robotic surface cleaning device to remain substantially within areas of the surrounding environment corresponding to the at least one identified region of interest during cleaning operations.

2. The control system of claim 1, wherein the controller is implemented within the hand-held surface cleaning device, and wherein the command is transmitted via the antenna arrangement of the hand-held surface cleaning device to the robotic surface cleaning device, and wherein the command is further configured to update a map in a memory of the robotic surface cleaning device based on the at least one identified region of interest.

3. The control system of claim 1, wherein the controller is implemented within the robotic surface cleaning device, and wherein the hand-held surface cleaning device sends the plurality of captured location data points to the robotic surface cleaning device within the surrounding environment via the antenna arrangement of the hand-held surface cleaning device.

4. The control system of claim 1, wherein the controller identifies the at least one region of interest in the map based on the translated localized coordinates collectively forming a shape.

5. The control system of claim 1, wherein the hand-held surface cleaning device further includes a second sensor, the second sensor being an image sensor.

6. The control system of claim 5, wherein the controller identifies at least one obstacle within the at least one identified region of interest based on image data from the image sensor of the hand-held surface cleaning device or based on user input.

7. The control system of claim 5, wherein the controller identifies at least one surface type within the at least one identified region of interest based on image data from the image sensor of the hand-held surface cleaning device, and wherein the controller causes the robotic surface cleaning device to adjust a cleaning mode when performing cleaning operations within the at least one identified region of interest based on the at least one identified surface type.

8. The control system of claim 6, wherein the controller updates the map to include a representation of the at least one identified obstacle, and wherein the robotic surface cleaning device navigates around the obstacle during cleaning operations based on the updated map.

9. The control system of claim 1, wherein the hand-held surface cleaning device includes a dust cup fluidly coupled to the nozzle and the suction motor, and, wherein a longitudinal axis of the body intersects both the nozzle and the handle and the power supply includes one or more batteries disposed within the handle.

* * * * *